United States Patent [19]
Provancher

[11] 3,794,794
[45] Feb. 26, 1974

[54] IMPACT RESPONSIVE SWITCH WITH FRANGIBLE ELEMENT HOLDING CONTACT PLUNGER IN UNACTIVATED POSITION

[75] Inventor: Ronald W. Provancher, Dearborn, Mich.

[73] Assignee: Ford Motor Company, Dearborn, Mich.

[22] Filed: Nov. 10, 1972

[21] Appl. No.: 305,620

[52] U.S. Cl.......... 200/61.53, 200/61.08, 200/168 F
[51] Int. Cl.................... H01h 35/14, H01h 9/00
[58] Field of Search... 200/16 B, 16 C, 16 D, 61.08, 200/61.45 R, 61.53, 166 BH

[56] References Cited
UNITED STATES PATENTS

| | | | |
|---|---|---|---|
| 2,997,883 | 8/1961 | Wilkes.................... | 200/61.53 X |
| 2,105,286 | 1/1938 | Jennings................... | 200/61.08 |
| 3,217,121 | 11/1965 | Hradek et al............ | 200/61.53 |
| 3,485,973 | 12/1969 | Kaiser..................... | 200/61.53 X |
| 3,649,786 | 3/1972 | Mauron.................... | 200/61.53 |
| 3,286,064 | 11/1966 | Wilson et al............. | 200/61.08 X |
| 3,341,671 | 9/1967 | Anater et al............. | 200/16 B |
| 3,702,637 | 11/1972 | Bower..................... | 200/61.08 X |

Primary Examiner—James R. Scott
Attorney, Agent, or Firm—John J. Roethel; Keith L. Zerschling

[57] ABSTRACT

The impact switch is responsive to the movement of a vehicle member subjected to an impact force as the result of a vehicle collision with a fixed object or another vehicle. The switch comprises a plunger device movable longitudinally within the cylindrical housing containing axially spaced electrically conductive contact rings. The plunger device carries an electrically conductive contact means engagable with the contact rings in sequence as the plunger device is driven into the housing. A shear pin normally holds the plunger device against displacement such as could be caused by vibration or longitudinally exerted inertial forces. Upon a predetermined impact force being applied to the plunger device, the shear pin is adapted to shear and permit displacement of the plunger means. Engagement of the plunger contact means with the contact rings closes an electrical circuit through the switch. The closed electrical circuit may be used to trigger an airbag system or other vehicle passenger restraint device.

6 Claims, 2 Drawing Figures

PATENTED FEB 26 1974
3,794,794
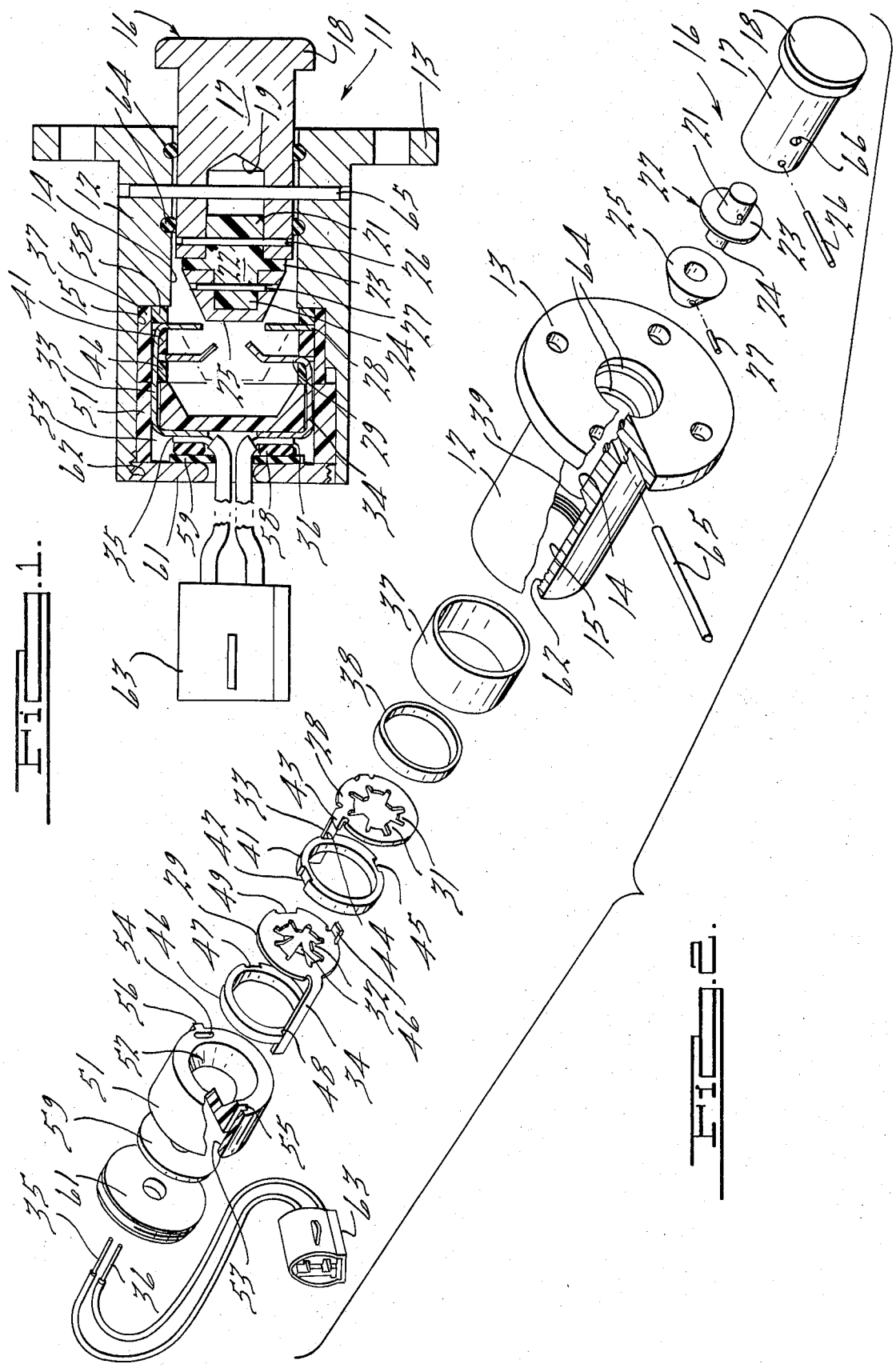

3,794,794

IMPACT RESPONSIVE SWITCH WITH FRANGIBLE ELEMENT HOLDING CONTACT PLUNGER IN UNACTIVATED POSITION

BACKGROUND OF THE INVENTION

As disclosed in U.S. Pat. No. 3,495,675, issued Feb. 17, 1970 to David P. Hass et al, for "Vehicle Safety Method and Apparatus Using Expandable Confinement," passenger restraint devices, such as an airbag system, are actuatable by an actuating mechanism having a plurality of sensing devices for sensing the inertial and impact forces imposed on a vehicle under collision conditions. In order for the safety device to be actuated, all of the sensing devices must repond to predetermined forces acting on each one. In general, the sensing devices comprise one or more acceleration or inertia operated electrical switches in series with at least one impact actuated electrical switch, the latter being responsive to impact induced movement of a vehicle structural member or a support member.

It is an object of the present invention to provide an impact actuated electrical switch that will be immune to accidental actuation by inertial or vibratory forces and which will be actuated only upon being subject to an impact force of a predetermined value.

SUMMARY OF THE INVENTION

The present invention relates to an impact responsive switch comprising a cylindrical housing having internally mounted, axially spaced, electrically conductive contact means. A plunger means is slidably journalled at one end of the housing for displacement movement longitudinally therein. The plunger means carries at its inner end an electrically conductive contact means adapted to engage the housing mounted contact means upon impact induced displacement of the plunger means into the cylindrical housing. A shear pin means holds the plunger means against displacement movement other than when caused by a predetermined impact force.

DESCRIPTION OF THE DRAWING

Further features and advantages of the present invention will be made more apparent as this description proceeds, reference being had to the accompanying drawing, wherein:

FIG. 1 is a vertical section through an impact responsive switch embodying the present invention; and FIG. 2 is an exploded view of the components of the switch.

DETAILED DESCRIPTION OF THE INVENTION

With reference to the drawing, there is shown an impact responsive switch, generally designated 11, having a cylindrical housing 12 provided at one end with a mounting flange 13. The housing has a longitudinally extending axially stepped cylindrical chamber 14–15 therein, the lower section 15 being somewhat larger in diameter than the upper section 14. The cylindrical housing 12 is preferably made of an aluminum alloy.

The terms upper and lower as used herein refer to the relationship of the parts as they appear in FIG. 1. As installed in a vehicle, the switch 11 probably would be mounted in a horizontal plane with its flange 13 end toward the front or forward end of the vehicle.

The housing 12 receives in its upper chamber section 14 a crash detector plunger means, generally designated 16. The plunger means 16 comprises a cylindrical aluminum alloy plunger or anvil member 17 capped by an impact head 18. The anvil member 17 has an inwardly longitudinally extending aperture 19 in its bottom end which receives the shank end 21 of a plastic or electrically nonconductive connecting pin 22. The pin 22 has a flange 23 at least equal in diameter to the diameter of the anvil member 17. The connecting pin 22 has on the side of its flange 23 opposite its shank end 21 a pilot end 24. The pilot end 24 receives a frusto-conical contact point 25. The contact point 25 is made of copper and, accordingly, is an electrical conductor.

The connecting pin 22 is held in place on the anvil member 17 by a spring steel pin 26 which extends laterally through the anvil member 17 and the shank end 21 of the connecting pin 22. The contact point 25 is held on the connecting pin 22 by a spring steel pin 27 which extends through the contact point 25 and the pilot end 24 of the connecting pin 22.

The contact point 25 is adapted to engage axially spaced electrically conductive contact means mounted within the section 15 of the housing 12. The axially spaced contact means comprise a pair of copper rings 28 and 29. The ring 28 is provided with a plurality of radially inwardly projecting flat contact fingers 31. The ring 29 has a plurality of contact fingers 32 having upperly angled tips. Each ring has at one side an elongated tab 33 and 34, respectively, which is adapted to be connected to a wire lead 35 and 36, respectively, as will be more fully explained.

The contact rings 28 and 29 are insulated from one another and from the walls of the cylindrical housing 12 by a plurality of plastic or nonconductive material rings. From right to left as viewed in FIG. 2, the rings comprise an outer seating ring 37 the external diameter of which has a slip-fit relationship to the diameter of the lower cylindrical chamber section 15. The outer seating ring 37 internally receives an inner seating ring 38 which insulates the contact ring 28 from the end wall 39 of the chamber section 15.

The contact rings 28 and 29 are insulated from each other by an inner center seating ring 41. The inner center seating ring 41 has a series of three peripheral notches. The first of these notches, the notch 42, receives a tab 43 on the contact ring 28. The second notch 44 provides a passageway for the contact tab 33. The third notch 45 receives a tab 46 on the contact ring 29. The tabs and notches cooperate to position and hold the contact rings in a relationship to each other in which the contact tabs 33 and 34 are maintained 180° apart. The assembly of the contact rings and the insulating rings 41 and 38 within the outer ring 37 is completed by a seating ring 46. The seating ring 46 is provided with diametrically opposite notches 47 and 48 receiving the elongated tabs 33 and 34, respectively, of the contact rings 28 and 29.

It will be noted that the contact ring 29 on the side diametrically opposite the tab 34 has an enlarged peripheral cutout 49 providing a passageway for the tab 33 of the contact ring 28. In assembled relationship, there is no contact between the tab 33 and the contact ring 29.

A cylindrical plastic or nonconductive material cap 51 having an external diameter complementary to the internal diameter of the housing section 15 abuts the bottom end face of the seating ring 46. The cap 51 has a downwardly depending recess 52 for clearance for the end of the plunger means 16 upon the latter being driven into the housing. The cap 51 also has an upwardly extending recess 53 forming a chamber to receive the ends of the tabs 33 and 34 and the ends of the wire leads 35 and 36.

The cap 51 has in its side wall longitudinally extending slots 54 and 55 through which the elongated contact tabs 33 and 34, respectively, project. In assembled relationship, the tab ends are bent inwardly toward the center of the housing and soldered to the ends of the wire leads 35 and 36, as best seen in FIG. 1. The cap 51 has a longitudinally extending rib 56 on one side which is keyed to a slot 57 in the inner wall of the housing for positioning and holding the cap against rotation.

To complete the lower end of the switch assembly, a sealer or rubber compound 58 may be placed in the end recess 51 and covered by a rubber disc or insulator 59. A threaded aluminum end cap 61 may then be screwed into the internally threaded lower end 62 of the housing section 15.

The wire leads 35–36 are adapted to be coupled to a safety device actuating electric circuit by a suitable connector 63.

The plunger means 16 is axially positioned within the chamber section 14 by spaced "O" rings 64. It is held against longitudinal displacement by a brass shear pin 65 which projects through the wall of the housing and through an aperture 66 in the anvil member 17.

The impact responsive switch 11 is adapted to be mounted on a vehicle structure in a position to sense deformation of a portion of the vehicle body or movement of a vehicle body member resulting from a collision of the vehicle with a fixed object or another vehicle. In this respect, the switch differs from an inertial switch which senses the sudden stoppage of the vehicle resulting from the collision with a fixed object or another vehicle.

Most vehicles are expected to be equipped with energy absorbing bumper systems. Many of these systems embody a piston or ram member which is movable under controlled conditions in response to an impact force exerted on the vehicle bumper. The present switch is adapted to be mounted in a position in which the anvil member 17 will be engaged by the energy absorbing bumper movable member, such as the ram, and then will be driven into the cylindrical housing 12. The anvil member 17 is held by the brass shear pin 65 the size of which is calibrated so that it will shear at a predetermined force being applied to the anvil head 18. If the applied force is sufficient to shear the pin 65, the anvil 17 will be driven longitudinally into the cylindrical housing 12 to a position in which the electrically conductive tip 25 will be driven through the flat fingers of the contact ring 28 into engagement with the upwardly inclined fingers 32 of the contact ring 29. The electrical circuit then will be closed from the lead 35 through the contact ring 28 through the contact point 25 through the contact ring 29 to the lead 36. If the inertial switches of the vehicle have been triggered, current then will flow to the airbag detonation device or to the triggering mechanism for any other type of passenger restraint system intended to be placed into operation under predetermined impact or collision conditions.

It is to be understood that the invention is not limited to the exact construction illustrated and described above, but that various changes and modifications may be made without departing from the spirit and scope of the invention defined by the following claims:

I claim:

1. An impact responsive switch comprising a cylindrical housing, electrically conductive contact means longitudinally axially spaced within the housing, the axially spaced contact means comprising a pair of rings having radially inwardly projecting contact fingers, plunger means slidably journalled at one end of the housing for longitudinal displacement movement therein, the plunger means comprising an anvil the inner end of which projects into the housing, a nonconductive connector member carried on the anvil inner end, and electrically conductive contact member coupled to the connector member, the electrically conductive contact member being of sufficient length to bridge the axially spaced contact means upon impact induced axial displacement of the plunger means into the cylindrical housing, and shear pin means holding the plunger means against displacement movement below a predetermined impact force.

2. An impact responsive switch according to claim 1, in which:

the shear pin means couples the plunger means anvil to the cylindrical housing.

3. An impact responsive switch according to claim 2, in which:

the axially spaced electrically conductive contact means are axially spaced from each other by a plurality of axially positioned nonconductive spacer rings.

4. An impact responsive switch according to claim 3, in which:

the axially spaced electrically conductive means are spaced from the inner wall of the cylindrical housing by a nonconductive ring concentric with the spacer rings.

5. An impact responsive switch according to claim 1, in which:

the axially spaced contact means rings are axially positioned within the cylindrical housing by a plurality of nonconductive spacer rings.

6. An impact responsive switch according to claim 5, in which:

the contact means rings are positioned in nonconductive relationship to the inner wall of the cylindrical housing by a nonconductive ring concentric with the spacer rings.

* * * * *